United States Patent
Ai et al.

(10) Patent No.: US 12,127,224 B2
(45) Date of Patent: Oct. 22, 2024

(54) SERVING CELL STATE MANAGEMENT

(71) Applicant: ZTE CORPORATION, Guangdong (CN)

(72) Inventors: Jianxun Ai, Shenzhen (CN); He Huang, Shenzhen (CN); Xiaojuan Shi, Shenzhen (CN); Jing Liu, Shenzhen (CN); Fei Dong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 525 days.

(21) Appl. No.: 17/385,123

(22) Filed: Jul. 26, 2021

(65) Prior Publication Data

US 2021/0352654 A1   Nov. 11, 2021

Related U.S. Application Data

(63) Continuation of application No. PCT/CN2019/074636, filed on Feb. 2, 2019.

(51) Int. Cl.
*H04W 72/51* (2023.01)
*H04W 72/0446* (2023.01)
*H04W 72/0453* (2023.01)
*H04W 72/23* (2023.01)
*H04W 80/02* (2009.01)

(52) U.S. Cl.
CPC ....... *H04W 72/51* (2023.01); *H04W 72/0446* (2013.01); *H04W 72/0453* (2013.01); *H04W 72/23* (2023.01); *H04W 80/02* (2013.01)

(58) Field of Classification Search
CPC ......... H04W 52/0206; H04W 52/0225; H04W 72/0446; H04W 72/0453; H04W 72/23; H04W 72/51; H04W 76/19; H04W 76/27; H04W 80/02; H04B 7/0695
USPC ................ 370/329, 225, 252, 318, 331, 277
See application file for complete search history.

(56) References Cited

U.S. PATENT DOCUMENTS

| | | | |
|---|---|---|---|
| 2016/0127107 A1 | 5/2016 | Zhang et al. | |
| 2018/0212743 A1 | 7/2018 | Dinan | |
| 2019/0021052 A1 | 1/2019 | Kadiri et al. | |
| 2019/0281587 A1* | 9/2019 | Zhang | H04W 72/23 |
| 2019/0327115 A1* | 10/2019 | Zhang | H04B 5/0037 |
| 2020/0092814 A1* | 3/2020 | Zhou | H04W 52/0235 |
| 2020/0196383 A1* | 6/2020 | Tsai | H04L 1/1614 |
| 2021/0320711 A1* | 10/2021 | Lee | H04W 74/0833 |

FOREIGN PATENT DOCUMENTS

| | | |
|---|---|---|
| CN | 102088433 A | 6/2011 |
| CN | 102378210 A | 3/2012 |
| WO | WO-2016/121457 A1 | 8/2016 |

OTHER PUBLICATIONS

Extended European Search Report for EP Appl. No. 19912239.1, dated Jan. 19, 2022 (10 pages).

(Continued)

*Primary Examiner* — Joseph Arevalo
(74) *Attorney, Agent, or Firm* — Foley & Lardner LLP

(57) ABSTRACT

Methods, systems, and devices related to related to digital wireless communication, and more specifically, to techniques related to maintaining a serving cell state. In one exemplary aspect, a method for wireless communication includes detecting an occurrence of an event. The method also includes modifying the state configuration of the serving cell based on the occurrence of the event.

16 Claims, 7 Drawing Sheets

(56) References Cited

OTHER PUBLICATIONS

Huawei et al., "Discussion on BWP inactivity timer" 3GPP TSG-RAN2#AH-1801, R2-1800189, Jan. 26, 2018, Vancouver, Canada (5 pages).
International Search Report and Written Opinion for PCT Appl. No. PCT/CN2019/074636, mailed Nov. 4, 2019 (6 pages).
Asustek, "Remaining issues on beam management", 3GPP TSG RAN WG1 Meeting #93, R1-1807210, May 25, 2018, Busan, Korea (9 pages).
Communication pursuant to Article 94(3) EPC for EP Appl. No. 19912239.1, dated Jul. 11, 2024 (6 pages).

\* cited by examiner

SERVING CELL STATE MANAGEMENT

CROSS-REFERENCE TO RELATED APPLICATION

This application claims the benefit of priority under 35 U.S.C. § 120 as a continuation of PCT Patent Application No. PCT/CN2019/074636, filed on Feb. 2, 2019, the disclosure of which is incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to maintaining a state of a serving cell.

In one exemplary aspect, a method for wireless communication is disclosed. The method includes detecting an occurrence of an event. The method also includes modifying the state configuration of the serving cell based on the occurrence of the event.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
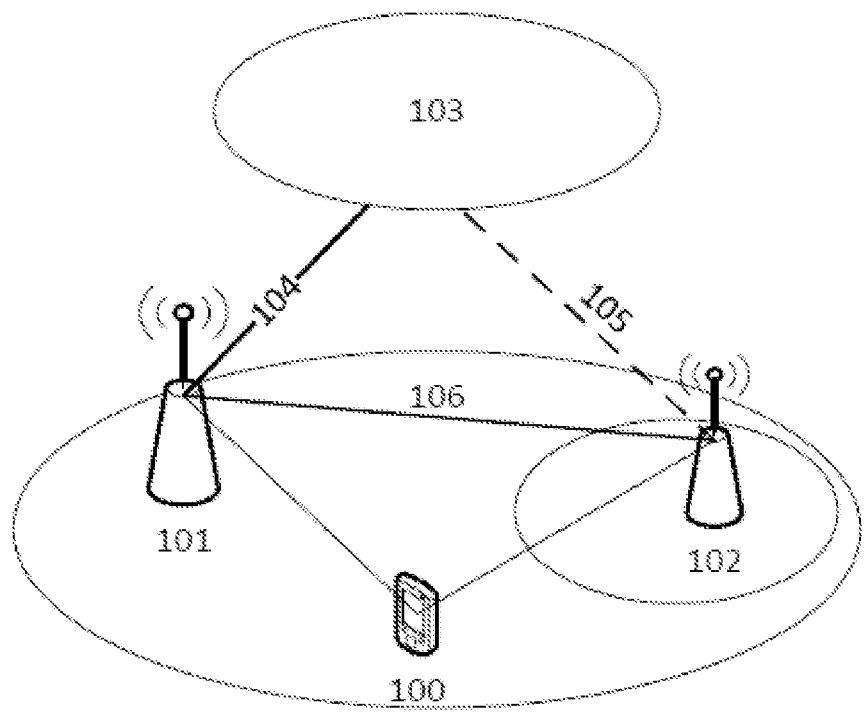
FIG. 1 shows an exemplary schematic diagram of a system architecture for Dual Connectivity (DC).

As NR emerges in the wireless domain, UEs will be capable of supporting both protocols at the same time. FIG. 1 shows an exemplary schematic diagram of a system architecture for Dual Connectivity (DC). The current base station (referred to as the first network element 101) in the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane. On the wired interface side, the first network element 101 and the core network 103 establish a control plane interface 104 for the UE 100. The second network element 102 and the core network 103 may establish a user plane interface 105 for the UE 100. An interface 106 (e.g., Xn interface) inter-connects the two network elements. On the wireless interface side, the first and the second network elements (101 and 102) may provide radio resources using the same or different Radio Access Technologies (RATs). Each of the network element can schedule transmissions with the UE 100 independently. The network element that has a control plane connection to the core network is referred to as the master node (e.g., the first network element 101), and the network element that has only a user plane connection with the core network is referred to as the secondary node (e.g., the second network element 102). In some cases, the UE 100 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

This patent document describes techniques that can be implemented to manage a configuration state of a serving cell. In some cases, a base station (or "network node") may add a secondary cell (SCell) to an activated cell group. A UE (or "terminal") may start to monitor a physical downlink control channel (PDCCH) on the SCell, and be ready for uplink transmission (e.g., physical uplink control channel (PUCCH), physical uplink shared channel (PUSCH)) after the terminal receives a RRC message containing configuration information for adding the SCell.

In some systems, a SCell may be configured in any of an activated state, a deactivated state, or a dormant state based on receipt of a medium access control (MAC) control element (CE) or RRC message. When a SCell is in dormant state, the SCell may be configured with dormant state specific channel quality Indication (CQI) resources. The UE may perform channel monitoring and CQI reporting without monitoring a PDCCH. If a SCell is in deactivated state, the UE may not perform CQI reporting or PDCCH monitoring on the SCell. With CQI reporting in the dormant state, the delay in time domain needed to activate a SCell in the dormant state may be smaller than that needed from deactivated state.

However, some systems do not address issues when implementing similar functions to 5G new radio (NR) system. These issues may include bandwidth part (BWP) operation, beam management, uplink time alignment when transit a serving cell from/to dormant state, or when keep a serving cell in dormant state.

In any of the example embodiments of the present disclosure, the base station may configure a serving cell to a cell group in one of an activated, deactivated or dormant state by a RRC message or a MAC CE. The base station may configure one or more timers to control the state transition of a serving cell. Specifically, the base station may configure a deactivation timer controlling whether to switch the serving cell state to a deactivated state, or a hibernation timer controlling whether to switch the serving cell state to a dormant state. For example, if the deactivation timer associated with a serving cell expires, the UE may transition/modify the serving cell state to the deactivated state. Similarly, if the hibernation timer associated with a serving cell expires, the UE may transition/modify the serving cell into dormant state if the serving cell is in an activated state.

In any of the example embodiments of the present disclosure, a configuration configured for a serving cell may be serving cell specific, i.e. common for all UEs and/or dedicated to a UE, i.e. a different UE may be configured with a configuration dedicated for the serving cell.

Example Embodiment 1

Example Embodiment 1 relates to BWP operation when adding a serving cell and modifying a state of the serving cell. Generally, a BWP may be a segment in frequency domain within a cell carrier bandwidth. The BS may configure a serving cell with one or more BWPs via an RRC message or system information. In an embodiment, each BWP may include at least one of an uplink BWP configuration and a downlink BWP configuration, and each BWP may be assigned a BWP identifier (or BWP ID).

Figure 2:
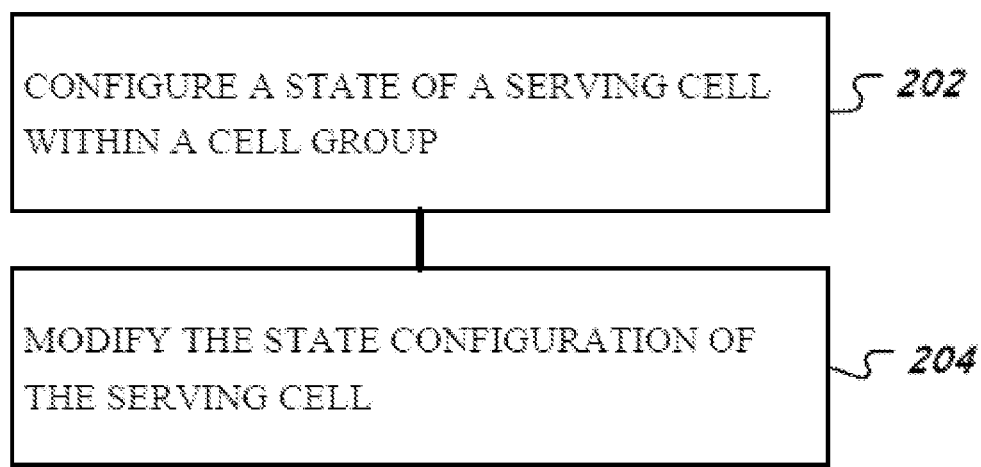
FIG. 2 illustrates a block diagram of a method to manage a state of a serving cell.

FIG. 2 illustrates a block diagram of a method to manage a state of a serving cell. A state of a serving cell included within a cell group may be configured by one of a base station or a terminal (block 202). The BS may configure a serving cell with one of a default BWP, an initial BWP, and a first active BWP by assigning a BWP ID for each of BWPs or by configuring a set of parameters to for a BWP. Specifically, a serving cell may be configured with a default downlink BWP ID (defaultDownlinkBWP-Id), a default uplink BWP ID, an initial downlink BWP (initialDownlinkBWP), an initial uplink BWP (initialUplinkBWP), a first active downlink BWP ID (firstActiveDownlinkBWP-Id), and first active uplink BWP ID (firstActiveUplinkBWP-Id).

With a serving cell, one or more BWPs may be activated by the UE, which may be referred to as an active BWP. The active BWP may include active uplink BWP and active downlink BWP. A UE may be configured with a BWP inactivity timer associated with an active BWP. In an embodiment, when a BWP inactivity timer expires, the UE may modify/switch an active BWP to one of a default BWP (indicated by defaultDownlinkBWP-Id) if the default downlink BWP is configured for the serving cell, or an initial BWP (indicated by initialDownlinkBWP) if default downlink BWP is not configured for the serving cell. As part of active BWP switching/modification, a BWP inactivity timer associated with a new active BWP may be started or restarted if the timer is already started.

A terminal may modify a state configuration of the serving cell (block 204).

In a first case, a serving cell may be configured in a dormant state when the serving cell is added to a cell group. In an embodiment, a terminal may activate a downlink (DL) BWP or an uplink (UL) BWP according to first active downlink BWP (indicated by firstActiveDownlinkBWP-Id) and first active uplink BWP (indicated by firstActiveUplinkBWP-Id) configured for this serving cell respectively.

In an embodiment, the UE may activate a DL BWP or UL BWP according to a first active downlink BWP for dormant state and first active uplink BWP for dormant state. The base station may configure the serving cell with the first active downlink BWP for dormant state or first active uplink BWP for dormant state via a RRC message or system information for the serving cell. The first active BWP configuration for a serving cell state modified to a dormant state may be different to the configuration for the serving cell state modified to an activated state.

In an embodiment, the UE may activate a DL BWP or UL BWP according to default downlink BWP configuration or default uplink BWP configuration if the default BWP configuration is configured by the BS for this serving cell. If the default BWP is not configured at the serving cell, the DL BWP and UL BWP may be activated according to the initial BWP configuration configured for the serving cell.

In an embodiment, the UE may activate a DL BWP or UL BWP according to an initial BWP configuration configured for the serving cell.

In a second case, the serving cell may be modified from an activated state to a dormant state. In this case, the UE may keep a currently active BWP for the serving cell. The UE may keep or restart an associated BWP inactivity timer running if the timer is running. This may indicate that when the serving cell state is modified from the activated state to the dormant state, the BWP modification/switching may not be performed until the associated BWP inactivity timer expires or a signaling via PDCCH is received to switch the active BWP for this serving cell.

In an embodiment, the current active BWP for this serving cell may be kept active. The UE may also stop a BWP inactivity timer associated with the active BWP if it is running. If the serving cell is modified/switched from the activated state to the dormant state, the active BWP of the serving cell may be the same as it is in activated state. The BWP switching may be triggered by receiving a message, receiving a MAC CE, or a PDCCH DCI that indicates a BWP modification for the serving cell.

In an embodiment, the active BWP may be modified/switched to a BWP that is used when the serving cell is switched/modified from the activated state to the dormant state. This BWP may comprise a downlink BWP or a uplink BWP. This BWP may be configured to be activated when the associated serving cell is switched/modified from activated state to dormant state. The BWP may be configured by the base station via a RRC message, or system information, or indicated by the MAC CE or PDCCH DCI, which is used to modify the serving cell to the dormant state. The UE may start or restart an BWP inactivity timer upon the BWP switching.

In an embodiment, the active BWP may be switched to a default BWP if the default BWP for the serving cell is configured. Otherwise, UE may perform BWP switching to an initial BWP if the initial BWP is configured for the serving cell. If the serving cell state transitions/switches from the activated to dormant state, the active BWP of the serving cell may be different than the active BWP before the serving cell state transition.

If the serving cell is configured with uplink radio resources for channel quality information (CQI) or channel state information (CSI) reporting on another serving cell, the UE may deactivate any active uplink BWPs associated with the serving cell and stop any BWP inactivity timers associated with the active uplink BWP if it is running. The base station may control the UE behavior on whether to deactivate any active uplink BWPs in this case via an indicator included in a MAC CE, a RRC message, or a PDCCH DCI.

In a third case, the serving cell state may modify/transition from a deactivated state to a dormant state. In this case, the terminal may activate DL BWP or UL BWP according to first active downlink BWP (indicated by firstActiveDownlinkBWP-Id) and first active uplink BWP (indicated by firstActiveUplinkBWP-Id) configured for this serving cell. The UE may start a BWP inactivity timer upon the activation of the DL BWP or UL BWP.

In some embodiments, the terminal may activate a DL BWP or UL BWP according to a first active downlink BWP for dormant state and first active uplink BWP for dormant state respectively, which may be configured by the base station via a RRC message or system information for the serving cell. The first active BWP configuration for a serving cell being modified to the dormant state may be different than the configuration for the serving cell state being modified to the activated state. The UE may start a BWP inactivity timer upon activating the DL BWP or UL BWP.

In some embodiments, the terminal may activate a DL BWP or UL BWP according to configured default BWP if the default BWP for the serving cell is configured, or according to initial BWP configured for this serving cell if the default BWP for this serving cell is not configured. More specifically, if a default downlink BWP is configured, the terminal may activate UL BWP according to the configured default downlink BWP. If the default downlink BWP is not configured, the terminal may activate a downlink BWP according to initial downlink BWP. The terminal may activate uplink BWP according to initial uplink BWP.

In some embodiments, the terminal may activate no uplink BWP for the serving cell if an uplink resource for CQI/CSI reporting for the serving cell is configured on another serving cell.

In a fourth case, a serving cell state may be modified from the dormant state to a deactivated state upon either receiving a MAC CE or upon a timer expiration. In this case, the UE may deactivate any active BWP associated with the serving cell and stop BWP inactivity timer if the timer is running.

In a fifth case, a serving cell state may be modified from the dormant state to an activated state. In this case, the UE may perform BWP switching to first active downlink BWP and first active uplink BWP according to first active downlink BWP (indicated by firstActiveDownlinkBWP-Id) and first active uplink BWP (indicated by firstActiveUplinkBWP-Id) configured for this serving cell respectively, if a previous active UL BWP in dormant or active DL BWP in dormant are not the configured first active downlink BWP or first active uplink BWP respectively. The UE may start or restart the BWP inactivity timer.

In some embodiments, the UE may activate the DL BWP or UL BWP according to a first active downlink BWP (indicated by firstActiveDownlinkBWP-Id) and a first active uplink BWP (indicated by firstActiveUplinkBWP-Id) respectively, if there is no active BWP before the serving cell state transition. The UE may start the BWP inactivity timer.

In some embodiments, the UE may keep or maintain the active BWP of the serving cell when the serving cell is in dormant state and before the cell state modification, and start a BWP inactivity timer associated with the active BWP if it is not running or restart BWP inactivity timer if it is running, or in some embodiments, keep the BWP inactivity timer associated with the active BWP running.

In some embodiments, the UE may perform BWP switching to a first active downlink BWP or first active uplink BWP defined to be activated upon the serving cell state transition from a dormant to an activated state and are configured by the base station via a RRC message or system information. If the serving cell state is transitioned/modified from a dormant to an activated state, the first active BWP may be different to that when the serving cell transit from deactivated to activated state. The UE may start/restart the BWP inactivity timer.

If the UE starts or restarts a BWP inactivity timer when it is in dormant state, or upon transition the serving cell state to dormant state, the UE may use a BWP inactivity timer length dedicated for a dormant state, i.e. the base station may configure the BWP inactivity timer length for a serving cell in activated state and dormant state separately by comprising separate information IEs in a RRC message or system information.

If a serving cell is in dormant state, or if the serving cell is modified to a dormant state from the activated state or the deactivated state, the UE may perform a step on an active BWP. One such step may include reporting CQI or CSI for the active BWP via configure uplink resources for CQI or CSI reporting. Another such step may include transmitting PUCCH on the active BWP, if the PUCCH is configured on the active BWP. Another such step may include suspending any configured uplink grants of configured grant type 1 or type 2 on the active BWP. The UE may stop monitoring PDCCH on the active BWP. The UE may transmit random-access channel (RACH) on the BWP if PRACH occasions are configured on the active BWP.

The present embodiments may provide solutions on how to perform BWP operation when the serving cell state is modified to dormant state or from dormant state.

The present embodiments may reduce scheduling delay caused by BWP switching on serving cell state transition. When a serving cell state transition from dormant state to activated state, the BWP may not be changed/switching by applying some of the methods in this embodiment. For example, when a serving cell state is modified from activated state to dormant state, and from deactivated state to dormant state, and when configure a serving cell state as dormant via RRC message, the UE activate or switch active DL BWP or UL BWP according to a BWP configuration which is activated or switched to when the serving cell is activated from dormant state. The said BWP configuration may be first active downlink BWP and first uplink BWP, or first active BWP for dormant state and first active uplink BWP for dormant state, or initial downlink and uplink BWP. In this way, the active BWP is the same before and after serving cell state is modified to activated state from dormant state. Thus the CSI/CQI measurement on the downlink active BWP may be valid after the serving cell state transition. The BS can schedule on the active BWP according the CSI/CQI reported before the cell state transition, i.e. not need to waiting for new CSI/CQI measurement and reporting due to active BWP is changed before and after the serving cell state transition.

Example Embodiment 2

Example embodiment 2 relates to how a configured uplink grant and configured downlink assignment are handled when a serving cell is added in a dormant state, including the serving cell state transition between the dormant state.

Configured grant type 1 and configured grant type 2 may be a set of periodic uplink resources. A UE may utilize these uplink resources without dynamic scheduling signaling to save data transmission delay.

In a first case, a serving cell may be configured as a dormant state when the serving cell is added to a cell group. The UE may store configured grant Type 1 configuration associated with a BWP of the serving cell or associated with a serving cell provided by an RRC message from the base station. The UE may suspend any configured grant type 1 associated with a BWP of the serving cell or associated with the serving cell.

In a second case, a serving cell state may be modified from an activated state to a dormant state. In this case, the UE may clear any configured downlink assignment associated with any BWP of the serving cell. The UE may suspend a configured downlink assignment associated with any BWP of the serving cell. The configured downlink assignment may not be cleared/released when the serving cell is modified from activated state to dormant state.

The UE may clear any configured uplink grant Type 2 associated with any BWP of the serving cell. The UE may suspend any configured uplink grant type 2 associated with any BWP the serving cell. Suspending any configured uplink grant type 2 may mean that the configured uplink grant type 2 associated with a BWP or associated with the serving cell is not released when the serving cell is modified from activated state to dormant state.

The UE may suspend any configured uplink grant Type 1 associated with previous active BWP or any BWP of the serving cell.

In a third case, the serving cell may be modified from a dormant state to an activated state. In this case, the UE may initialize (or re-initialize) any suspended configured uplink grants of configured grant Type 1 associated with the active BWP of this serving cell. The UE may initialize (or re-initialize) any suspended configured uplink grants of configured grant Type 2 associated with active BWP of this serving cell. The UE may initialize (or re-initialize) any suspended configured downlink assignment associated with active BWP of this serving cell.

In a fourth case, the serving cell may be modified from a dormant state to a deactivated state. In this case, the UE may clear any stored configured uplink grant Type 2 configuration associated with any BWP of serving cell. The UE may clear any stored configured downlink assignment associated with any BWP of the serving cell. The UE may also keep suspending any configured uplink grant Type 1 associated with any BWP of the serving cell.

If there is any configured downlink assignment, configured uplink grant type 1, or configured uplink type 2 associated with a BWP or associated with the serving cell to be initiated due to the associated serving cell state transition from dormant state to activated state, or due to the serving cell is added as activated or dormant state, the UE may perform one of various steps. Such a step may include the UE starting to receive downlink transmission on the configured downlink assignment no earlier than when the UE is ready for PUCCH transmission for the serving cell. Such a step may include the UE starting to perform uplink transmission on the configured uplink grants no earlier than when the UE is ready for PDCCH monitoring on the serving cell.

In some embodiments, when a UE is in the dormant state, it may suspend the configured grant type 1 or configured grant type 2 or configured assignment instead of clearing them. When the BS activates the serving cell, the UE may activate/re-initialize the suspended configured grant type 1 or configured grant type 2 or configured assignment, i.e. the delay needed for an additional MAC to re-initiate configured grant or configured assignment may be saved.

When the serving cell is in dormant state, the configured downlink assignment and configured uplink grants may be suspended but not cleared. Thus, when the serving cell is activated from dormant state, the UE can restore (re-initiate) the suspended configured downlink assignments and configured uplink grants without the delay caused by reconfiguration of configured assignment or configured uplink grants otherwise.

Example Embodiment 3

Figure 3:
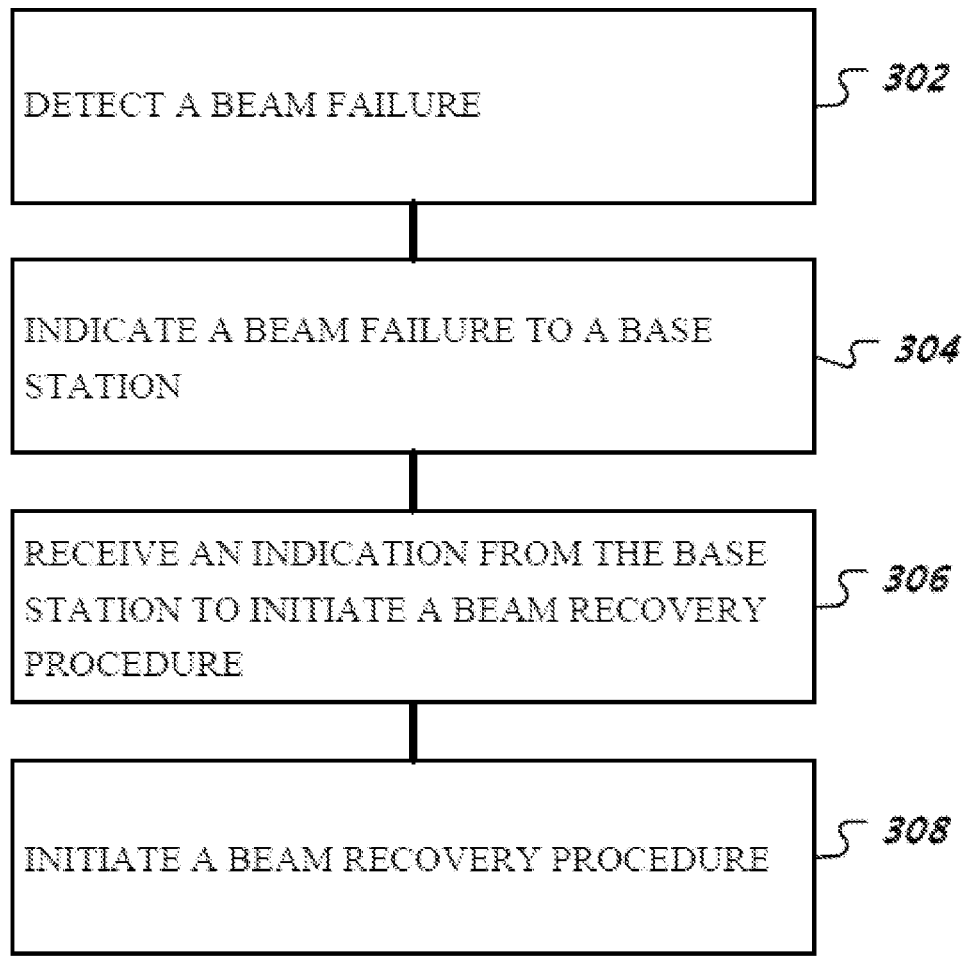
FIG. 3 illustrates a block diagram of a method to recover a failed beam of a serving cell.

Example Embodiment 3 relates to UE behavior when a beam failure is detected on the reference signal (e.g. SSB or CSI-RS) on a serving cell in a dormant state. FIG. 3 illustrates a block diagram of a method to recover a failed beam of a serving cell.

The terminal may detect a beam failure of the serving cell (block 302). For a serving cell in the dormant state, UE may perform beam failure detection on the serving cell by counting beam failure instance indication from the lower layers to the MAC entity. If the number of beam failure instances from the lower layer reaches a predetermined maximum number within a preconfigured timer duration, the UE may detect a beam failure.

In some embodiments, if the dormant serving cell detects a beam failure, the UE may perform at least one of various steps. Such a step may include the UE indicating to a base station that beam failure is detected on the serving cell (block 304). The UE may indicate a beam failure by transmitting a RRC message or a MAC CE to the base station. The RRC message may be transmitted from UE to the base station via the cell group that the serving cell belongs to, or via the cell group different to that the serving cell belongs to. The MAC CE may be transmitted from the UE to the base station via another serving cell of the cell group the serving cell belongs to, or via another serving cell of the cell group different to which this serving cell belongs to.

Such a step may include the UE changing the serving cell state to a deactivated state autonomously, or after receiving a MCE CE or a RRC message which indicates a request to modify the serving cell to a deactivated state. The UE may keep this serving cell in a dormant state before receiving a RRC message or MAC CE that configure the serving cell with another state.

Such a step may include the UE triggering a beam failure recovery procedure on this serving cell autonomously. A base station may transmit an indication to the terminal to initiate a beam failure recovery procedure (block 306). The terminal may initiate a beam failure recovery procedure (block 308). A base station may configure whether the UE can trigger beam failure recovery procedure for this serving cell in dormant state. By default, if this serving cell is a primary cell of a cell group (SpCell), the UE may trigger a beam failure recovery procedure when a beam failure is detected on the serving cell. The UE may initiate the beam failure recovery if beam failure recovery is allowed for a dormant state serving cell, UE initiates beam failure recovery procedure on this serving cell immediately after this serving cell is activated. In some embodiments, the UE initiates beam failure recovery procedure immediately upon the beam failure is detected on this serving cell.

The UE may trigger beam failure recovery procedure on the serving cell when it receives a PDCCH order via another serving cell of the same cell group or via another serving cell of a different cell group. In this case, the base station (BS) may indicate the UE to trigger a beam failure recovery for this serving cell when the BS receives a RRC message or a MAC CE transmitted from the UE to the BS to indicate beam failure is detected on this serving cell.

If a beam failure recovery is allowed for a dormant state serving cell, UE may initiate beam failure recovery procedure on this serving cell immediately after this serving cell is activated. The UE may initiate beam failure recovery procedure immediately upon the beam failure is detected on this serving cell.

The UE may perform BWP switching to switch an active BWP to default BWP if default BWP is configured for this serving cell, or to initial downlink BWP or initial uplink BWP if default BWP is not configured for this serving cell or keep current active BWP and the associated BWP inactivity timer if it is running. The UE may stop CQI/CSI reporting for this serving cell.

In an embodiment, the beam failure recovery procedure may be implemented by a random-access procedure for beam failure recovery (RA for beam failure recovery).

If UE indicates to the BS that beam failure is detected on the serving cell by a RRC message or a MAC CE, the RRC message or the MAC CE may include the cell group ID of the cell group to which the serving cell belongs, an indicator to indicate whether the serving cell belongs to secondary cell group, an indicator to indicate whether the serving cell belongs to master cell group, an indicator to indicate whether the serving cell belongs to the cell groups different to the cell on which the MAC CE is transmitted, the serving cell ID or index of the serving cell to identify the serving cell in a cell group, or across all cell groups configured to the UE.

The message may also include a measurement result of the serving cell, which may include cell level measurement results, or beam level measurement results. The beam level measurement results may include a list of reference signal ID, including SSB index and CSI-RS index, and the measurement quality on the reference signals.

When beam failure is detected on the serving cell in dormant state, the BS can be notified of the beam failure. Thus, when the BS intend to activate for data scheduling, it can avoid activating a serving cell occurs beam failure. Otherwise, if the BS activating a serving cell occurs beam failure, more delay will be caused to perform beam failure recovery, e.g. by trigger a RACH procedure. On the other side, when beam failure occurs, the present embodiments may provide methods on how to trigger beam failure recovery procedure to restore the beam for this serving cell.

Example Embodiment 4

Figure 4:
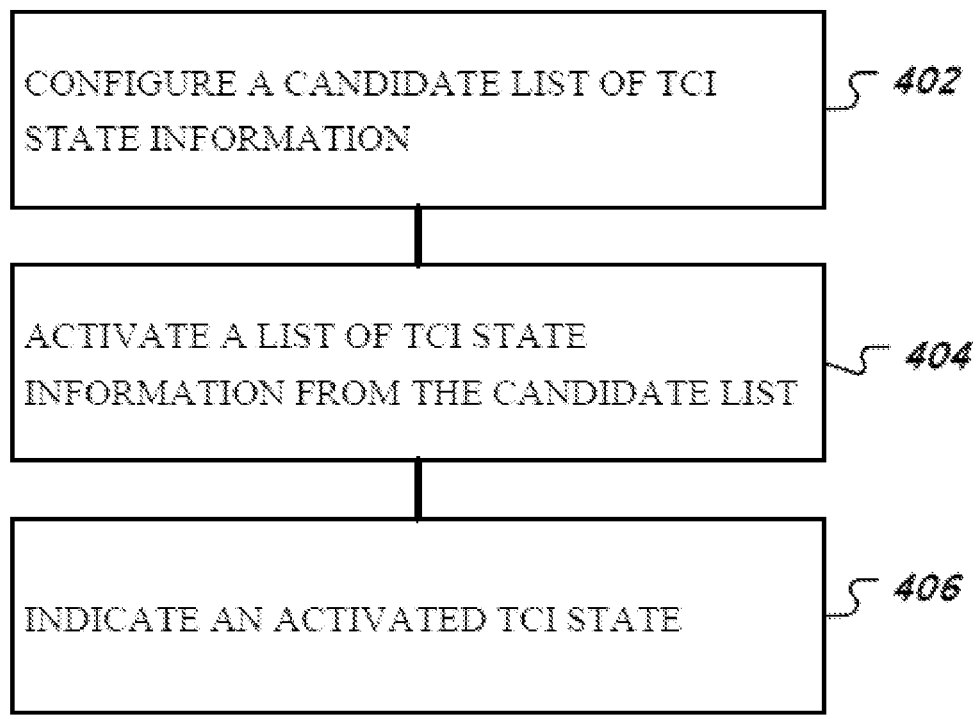
FIG. 4 illustrates a block diagram to configure and activate a TCI state configuration.

Example Embodiment 4 relates to a transmission configuration indicator (TCI) state configuration when adding a serving cell in an activated or dormant state. FIG. 4 illustrates a block diagram to configure and activate a TCI state configuration.

In many cases, TCI state information is used to indicate the beam for UE monitoring PDCCH or PDSCH by associating one or two downlink reference signals (SSB or CSI-RS in NR) with a corresponding quasi-colocation (QCL) type.

A set of TCI state information may include a TCI state ID, a cell ID of the serving cell in which the reference signal is configured, a BWP ID of downlink BWP in which the downlink reference signal is locate, a QCL type, and the reference signal ID (SSB index, or CSI-RS resource ID). When the serving cell ID is not configured in the TCI state information, the reference signal may be located in the serving cell for which the TCI state information is configured.

In many cases, the configured TCI states for PDCCH and PDSCH reception may be deactivated upon configuration via a RRC configuration. Also, in many cases, to configure the TCI state information used for PDCCH monitoring, the BS may first configure a list of candidate TCI state information for a CORSET configured for a downlink BWP of the serving cell via a RRC message. Second, the BS may indicate to the UE which TCI state information is used for PDCCH monitoring on a specific CORSET configured for a downlink BWP of a serving cell by a MAC CE transmitted from the BS to the UE, and comprising a serving cell ID which is used to indicate which serving cell the MAC CE is applied for, a control resource set ID (CORESET ID) which is used to indicate the CORESET for which the TCI state is indicated, a TCI state ID which is one of the candidate PDCCH TCI state which are configured via RRC message. The UE may apply the indicated TCI state information upon receiving the MAC CE.

In some cases, to configure the TCI state used for PDSCH reception, the BS may first configure a list of candidate TCI state information for PDSCH reception on a BWP via a RRC message. The BS may indicate the UE via a MAC CE which comprise a BWP ID, a bitmap to indicate which configured candidate TCI state information for PDSCH reception is activated. The BS may indicate which activated TCI state information is used for PDSCH reception on the BWP via a PDCCH signaling. The UE may apply a corresponding TCI state information for PDSCH reception on the BWP.

Example Embodiment 4 may relate to indicating the TCI state information used for PDCCH monitoring or PDSCH reception when the BS configures a serving cell as activated state or dormant state via RRC message or MAC CE. This may reduce the delay caused by the additional MAC CE and PDCCH signaling.

A candidate list of TCI state information may be configured (block 402). When the BS configures a serving cell as activated state or dormant state via a RRC message, e.g. to adding a serving cell to a cell group or to configure serving cell, the BS may include the serving cell configuration in the RRC message. The RRC message may comprise at least one of following: the serving cell ID, the cell group ID to which the serving cell belongs, a downlink BWP configuration. For a specific BWP configuration, the RRC message may include a list of candidate TCI state information for PDSCH reception. The RRC message may include a list CORESET for a specific downlink BWP, and for each control-resource set (CORESET), comprise a list of candidate TCI state information for PDCCH reception on the CORESET.

The RRC message may include the serving cell state information to indicate the state of the serving cell on application of the RRC message. The serving cell state indicated in the RRC message may be activated, dormant, or deactivated.

The RRC message may indicate which TCI state is used for PDCCH reception on a CORESET of a specific BWP of the serving cell via a RRC message. For a CORESET configured for a downlink BWP of the serving cell, the RRC message may indicate the TCI state ID or an index to the candidate TCI state information list configured for the CORESET, to indicate the TCI state used for PDCCH reception on the CORESET. The RRC message may include an indicator for each candidate TCI state information configured for the CORESET to indicate whether the corresponding TCI state information is used for PDCCH reception on the CORESET.

A list of TCI state information from the candidate list may be activated (block 404). On reception of the RRC message, the UE may apply the indicated TCI state information for PDCCH monitoring on the corresponding CORSET.

An activated TCI state may be indicated to a terminal (block 406). To configure the TCI state information used for PDSCH reception on a downlink BWP of a serving cell, the BS may indicate the activated TCI state information for PDSCH reception on a BWP via the RRC message. Then the BS may indicate which activated TCI state information is used for PDSCH reception via a PDCCH signaling. The UE may then apply the TCI state information indicated by the PDCCH signaling for PDSCH reception on the BWP.

In an embodiment, the BS may indicate which TCI state information is used for PDSCH reception on a downlink BWP in the RRC message besides the candidate TCI state information for PDSCH reception or activated TCI state information for PDSCH reception. In this case, the UE may apply the indicated TCI state to be used for PDSCH reception on the BWP upon reception of the RRC message.

To indicate the activated TCI state information for PDSCH reception or TCI information used for PDSCH reception or TCI information, the RRC message may include an indicator for each candidate TCI state information for PDSCH reception on a BWP. The indicator can be defined to indicate whether the corresponding TCI state information is activated or can be defined to indicate whether corresponding TCI state information is (actually) used for PDSCH reception on the BWP.

For a downlink BWP of the serving cell, the RRC message may include one or more activated TCI state information or TCI state information used for PDSCH reception. The TCI state information can be TCI state ID, a set of TCI state information, or an index to the candidate TCI state information list configured for the CORESET.

The BS may determine the candidate TCI state information for PDCCH or PDSCH, the activated TCI state information for PDSCH, and the TCI state information to be used for PDCCH and PDSCH reception according to the radio network deployment, serving cell configuration and measurement report sent from UE before configuring the serving cell to the UE.

The BS may configure the TCI state information used for PDCCH or PDSCH monitoring after the UE applies the configuration carried in the RRC message without an additional indication via a MAC CE. Accordingly, the delay caused by the additional MAC CE may be saved.

When the BS configures the serving cell in activated state or dormant state via a RRC message, the BS can configure the TCI state information for PDCCH reception or PDSCH reception in the same RRC message. Thus, upon reception of the RRC message, the UE can apply the TCI state information for PDCCH reception or PDSCH reception without an additional MAC CE to indicate the TCI state information.

Example Embodiment 5

Example Embodiment 5 relates to how to maintain uplink time alignment cross cell groups.

In many cases, uplink time alignment for a serving cell is implemented by Time Advance (TA) command MAC CE transmitted from the BS to the UE via the cell group to which the serving cell belongs. The TA command MAC CE comprise a Time Advance Group (TAG) ID, and a TA command information which is used to control the amount of time advancement for the TAG identified by the TAG ID. A serving cell may be configured with a TAG ID to indicate the TAG of the serving cell belongs to. The TAG ID may identify the TAG within the scope of a cell group.

To support uplink time alignment cross cell group, the BS may transmit a TA command MAC CE via a serving of cell group A for a TAG defined for cell group B. The TA command MAC CE include at least one of: a cell group ID information, TAG ID, and TA command information. The cell group ID information may be indicated implicitly by defining a dedicated MAC CE type (a Logical channel ID, LCD) indicated in the MAC CE sub-header, and dedicated for this usage. The UE may apply the TA command comprised in the MAC CE for the TAG indicated by TAG ID of the cell group B.

In an embodiment, to support uplink time alignment cross cell group, the BS may configure a serving cell of cell group B with a TAG ID defined for cell group A via a RRC message or a MAC CE. Specifically, the BS may configure the serving cell B with a cell group ID of cell group A along with TAG ID defined for cell group A. The BS may configure the TAG ID defined for cell group A to the UE by define an information element (IE), e.g. this IE is defined as a TAG ID of another cell group. Upon receiving a TA command MAC CE comprising the TAG ID defined for cell group A, UE may apply the TA command to the serving cell B.

The BS may define a TAG with unique TAG ID among cell groups via a RRC message. The BS configures a serving cell of any cell group with this TAG ID to indicate that this serving cell belongs to the TAG indicated by this TAG ID. The TA command MAC CE may include this TAG ID may be transmitted via any cell group. Upon receiving a TA command MAC CE comprising this TAG ID, the UE may apply the TA command to all serving cells that belong to this TAG.

The BS may associate a TAG A defined for cell group A to a TAG B defined for cell group B, by a TAG ID A in the configuration of TAG B. The UE may identify and apply TA command comprised in TA command MAC CE which comprise TAG ID A to TAG B on reception of the MAC CE. The TA command MAC CE comprising TAG ID A may be transmitted via cell group A. (equivalent)

By providing information to support uplink time alignment cross cell groups, serving cell of a cell group may be modified/transitioned to a dormant state, i.e. only CSI/CQI reporting is performed on this cell group while the UE does not monitor PDCCH on any serving cells of this cell group.

TA management can be implemented cross cell groups. In some cases, TAG may only comprise serving cells of a same cell group. Further, a TA command MAC CE may not be used for time advance adjustment cross cell groups. By applying the methods in this embodiment, a serving cell can be configured to a TAG which include serving cells of any cell groups, or can be configure to a TAG which is defined for a cell group different to the cell group to which the serving cell belongs, or two TAG defined for different cell group can be associated, or a TA command MAC CE can be transmitted cross cell groups, and thus the BS can adjust time alignment of a serving cell by transmit TA command MAC CE via a cell group different to the cell group to which the serving cell belongs.

Example Embodiment 6

Example Embodiment 6 relates to how to implement dormant state of a cell group where all serving cells in the cell group are in deactivated or dormant state, i.e. no serving cell in activated state. When a cell group is modified to a dormant state, there may be at least one serving cell in dormant state. In an embodiment, there is at least one serving cell is configured with PUCCH resource for CSI or CQI reporting.

The BWP operation for serving cell of this cell group can be implemented by one of the methods provided in Example Embodiment 1. The beam failure handling for serving cell of this cell group can be implemented by one the methods provided in Example Embodiment 3. The TCI state maintenance can be implemented by one the method provided in Example Embodiment 4. The uplink time alignment is maintained by one of the methods provided in Example Embodiment 5.

The BS may indicate the state of serving cell of this cell group via another cell group by including cell group information in the MAC CE used for serving cell state transition.

This MAC CE may include one of following: cell group ID information, the target state information, the cell ID information. The cell group ID information may be indicated implicitly by defining a dedicated MAC CE type, i.e. a Logical channel ID, LCID indicated in the MAC sub-header, and dedicated for this usage. The target state information may be indicated by the different MAC CE types, i.e. the LCID indicated in MAC sub-header, e.g. MAC CE for activating, MAC CE for deactivating, MAC for transiting to dormant state (hibernating) are defined separately with different LCIDs. The cell ID information may be represented by a bitmap comprised in the MAC CE and each bit of the bitmap re-present a serving cell configured to a cell group.

The BS can modify/transition all serving cells of a cell group into an activated state, dormant state, or deactivated state. The UE power may be saved due to having no PDCCH monitoring on all serving cells of this cell group, and at least one serving cell in dormant state can be activated rapidly.

Figure 5:
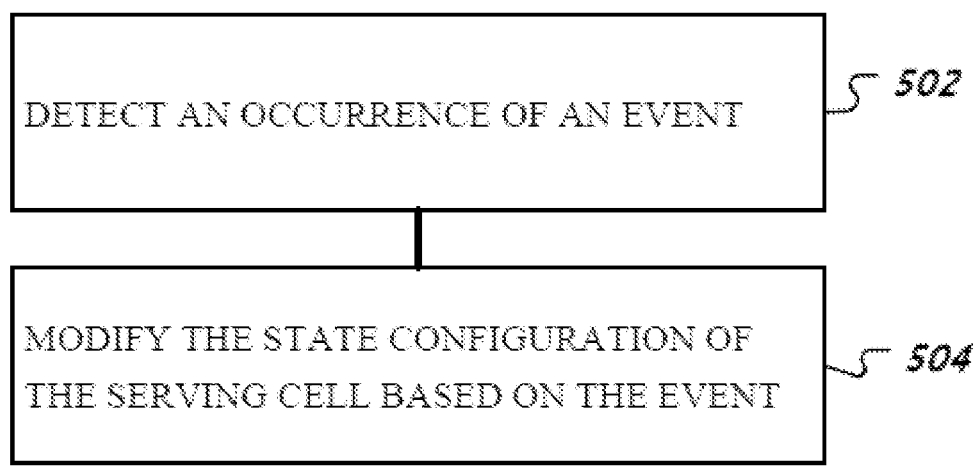
FIG. 5 illustrates a block diagram of a method to manage a serving cell.

FIG. 5 illustrates a block diagram of a method to manage a serving cell. A terminal may detect an occurrence of an event (block 502). The terminal may modify the state configuration of the serving cell based on the event (block 504).

In some embodiments, the event includes an expiration of a deactivation timer, and wherein the state configuration is modified to a deactivated state.

In some embodiments, the event includes an expiration of a hibernation timer, and wherein the state configuration is modified to a dormant state.

In some embodiments, the event includes receiving a message from a communication node, wherein the message includes the state configuration of the serving cell.

In some embodiments, the event includes identifying a beam failure of the serving cell.

In some embodiments, the method includes modifying the state configuration of the serving cell from an activated state to the dormant state.

In some embodiments, the method includes stopping, by the terminal, a BWP inactivity timer upon modifying the state configuration of the serving cell from the activated state to the dormant state.

In some embodiments, the method includes modifying, by the terminal, at least one of an active downlink BWP of the serving cell according to a first active downlink BWP configured for the serving cell and an active uplink BWP of the serving cell according to a first active uplink BWP configured for the serving cell.

In some embodiments, the method includes modifying, by the terminal, the state configuration of the serving cell from a deactivated state to the dormant state.

In some embodiments, the method includes activating, by the terminal, at least one of a downlink BWP according to a first active downlink BWP configured for the serving cell and an uplink BWP according to a first active uplink BWP configured for the serving cell.

In some embodiments, the method includes activating, by the terminal, a downlink BWP according to a first active downlink BWP configured for the dormant state of the serving cell, or an uplink BWP according to a first active uplink BWP configured for the dormant state of the serving cell.

In some embodiments, the method includes activating, by the terminal, the downlink BWP or the uplink BWP according to a default BWP for the serving cell that includes the default BWP.

In some embodiments, the method includes modifying, by the terminal, the state configuration of the serving cell from the dormant state to a deactivated state.

In some embodiments, the method includes deactivating, by the terminal, an active uplink BWP and an active downlink BWP associated with the serving cell; and stopping, by the terminal, a BWP inactivity timer.

In some embodiments, the method includes modifying, by the terminal, the state configuration of the serving cell from the dormant state to an activated state.

In some embodiments, the method includes modifying, by the terminal, at least one of an active downlink BWP of the serving cell according to a first active downlink BWP configured for the serving cell and an active uplink BWP of the serving cell according to a first active uplink BWP configured for the serving cell.

In some embodiments, the method includes activating, by the terminal, at least one of a downlink BWP of the serving cell according to a first active downlink BWP configured for the serving cell and an uplink BWP of the serving cell according to a first active uplink BWP configured for the serving cell, when there is not an active BWP at the serving cell.

In some embodiments, the method includes starting, by the terminal, an inactivity timer associated with an active uplink BWP or an active downlink BWP.

In some embodiments, the method includes reporting, by the terminal, at least one of a channel quality indicator (CQI) and a channel state information (CSI) for a downlink BWP to the communication node via configured uplink resources.

In some embodiments, the method includes suspending, by the terminal, at least one of a configured downlink assignment, a configured uplink grant type 2, and a configured uplink grant type 1 associated with at least one of an uplink BWP or a downlink BWP of the serving cell.

In some embodiments, the method includes initializing, by the terminal, at least one of a suspended configured uplink grant type 1, a suspended configured uplink grant type 2, and a suspended downlink assignment associated with at least one of an active uplink BWP and an active downlink BWP of the serving cell.

In some embodiments, the method includes identifying, by the terminal, a beam failure on a reference signal of the serving cell.

In some embodiments, the method includes transmitting, by the terminal, a beam failure indication to the communication node indicating the beam failure of the serving cell.

In some embodiments, the beam failure indication is transmitted via one of a second serving cell with a cell group that includes the serving cell and a third serving cell that includes a cell group that does not include the serving cell.

In some embodiments, the method includes modifying, by the terminal, the state configuration of the serving cell from the dormant state to a deactivated state upon identifying a beam failure or based on receiving a request from the communication node to modify the state configuration of the serving cell to the deactivated state.

In some embodiments, the method includes initiating, by the terminal, a beam failure recovery procedure on the serving cell based on determining that the terminal is allowed to initiate the beam failure recovery procedure.

In some embodiments, the beam failure recovery procedure is initiated based on receiving a PDCCH order at the terminal, wherein the PDCCH order is transmitted via one of a second serving cell with a cell group that includes the serving cell and a third serving cell that includes a cell group that does not include the serving cell.

In some embodiments, the method includes modifying, by the terminal, one of the active uplink BWP or active downlink BWP of the serving cell to one of a default BWP if the default BWP is configured for the serving cell and an initial BWP if the default BWP is not configured for the serving cell.

In some embodiments, the method includes stopping, by the terminal, CQI and CSI reporting for the serving cell.

In some embodiments, the beam failure indication is transmitted via one of a RRC message and a MAC CE, and wherein the beam failure indication includes at least one of a cell group identifier identifying a cell group associated with the serving cell, a serving cell identifier identifying the serving cell in the cell group, and a measurement result of the serving cell.

In some embodiments, the message from the communication node indicating configured state configuration of the serving cell includes at least one of a serving cell identifier, a cell group identifier identifying a cell group of the serving cell, a downlink BWP configuration, candidate transmission configuration indicator (TCI) state information for physical downlink shared channel (PDSCH) reception, a control-resource set (CORESET) information configured for a downlink BWP, wherein the CORESET information includes candidate TCI information for PDCCH reception.

In some embodiments, the message from the communication node indicating configured state configuration of the serving cell indicates a TCI state used for PDCCH reception on a CORESET of a BWP of the serving cell.

In some embodiments, the message indicates a TCI state identifier or an index to a candidate TCI state information associated with the CORESET to indicate the TCI state used for PDCCH reception on the CORESET, and wherein the terminal utilizes the TCI state information for PDCCH reception.

In some embodiments, the message includes an indicator for each candidate TCI state information configure for the CORESET to indicate whether TCI state information is used for PDCCH reception on the CORESET, and wherein the terminal utilizes the TCI state information for PDCCH reception.

In some embodiments, the message includes an indicator for each candidate TCI state information for physical downlink shared channel (PDSCH) reception on a downlink BWP, wherein the indicator indicates whether the candidate TCI state information is activated or used for PDSCH reception.

In some embodiments, the message includes activated TCI state or TCI state information used for PDSCH reception, wherein the TCI state information includes at least one of a TCI state identifier and an index for the candidate TCI state information configured for a BWP.

Figure 6:
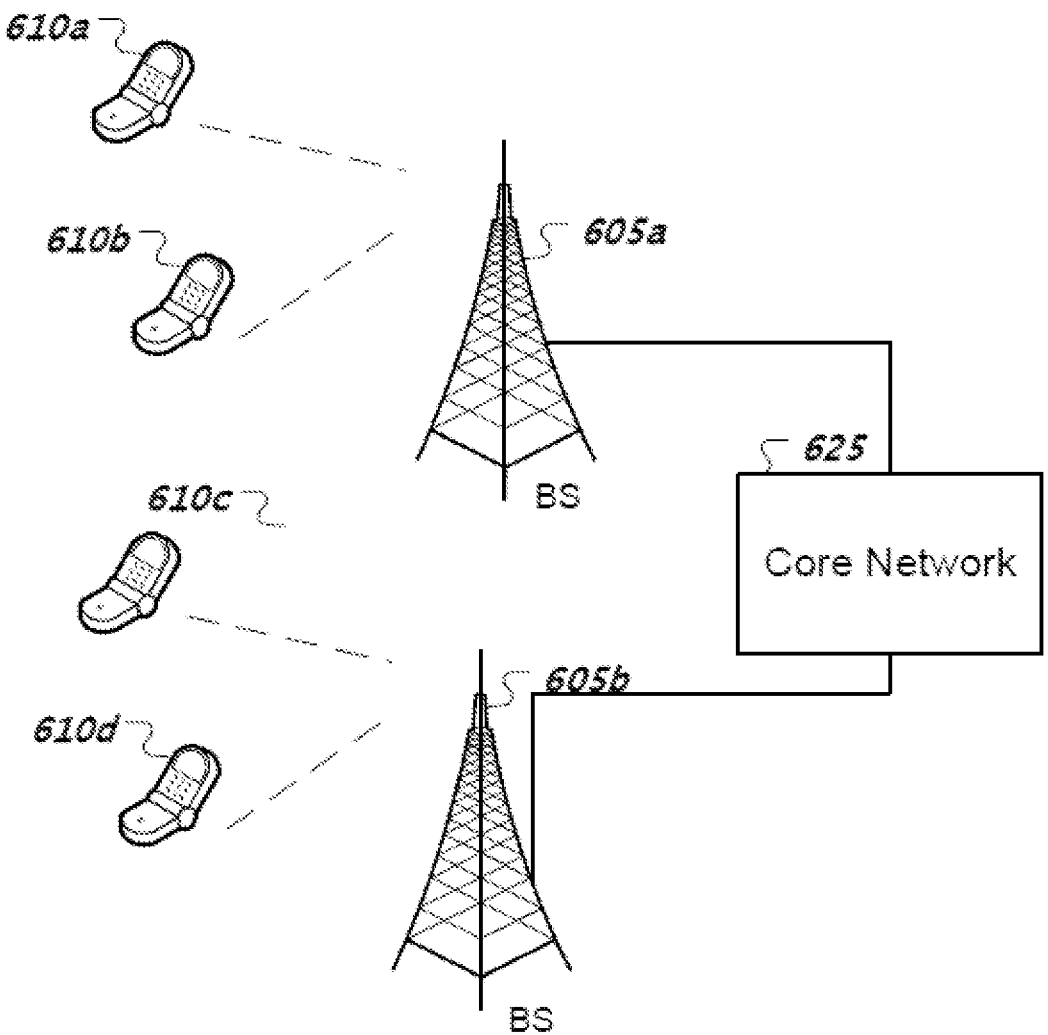
FIG. 6 shows an example of a wireless communication system where techniques in accordance with one or more embodiments of the present technology can be applied.

FIG. 6 shows an example of a wireless communication system where techniques in accordance with one or more embodiments of the present technology can be applied. A wireless communication system 600 can include one or more base stations (BSs) 605*a*, 605*b*, one or more wireless devices 610*a*, 610*b*, 610*c*, 610*d*, and a core network 625. A base station 605*a*, 605*b* can provide wireless service to wireless devices 610*a*, 610*b*, 610*c* and 610*d* in one or more wireless sectors. In some implementations, a base station 605*a*, 605*b* includes directional antennas to produce two or more directional beams to provide wireless coverage in different sectors.

The core network 625 can communicate with one or more base stations 605*a*, 605*b*. The core network 625 provides connectivity with other wireless communication systems and wired communication systems. The core network may include one or more service subscription databases to store information related to the subscribed wireless devices 610*a*, 610*b*, 610*c*, and 610*d*. A first base station 605*a* can provide wireless service based on a first radio access technology, whereas a second base station 605*b* can provide wireless service based on a second radio access technology. The base stations 605*a* and 605*b* may be co-located or may be separately installed in the field according to the deployment scenario. The wireless devices 610*a*, 610*b*, 610*c*, and 610*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 7:
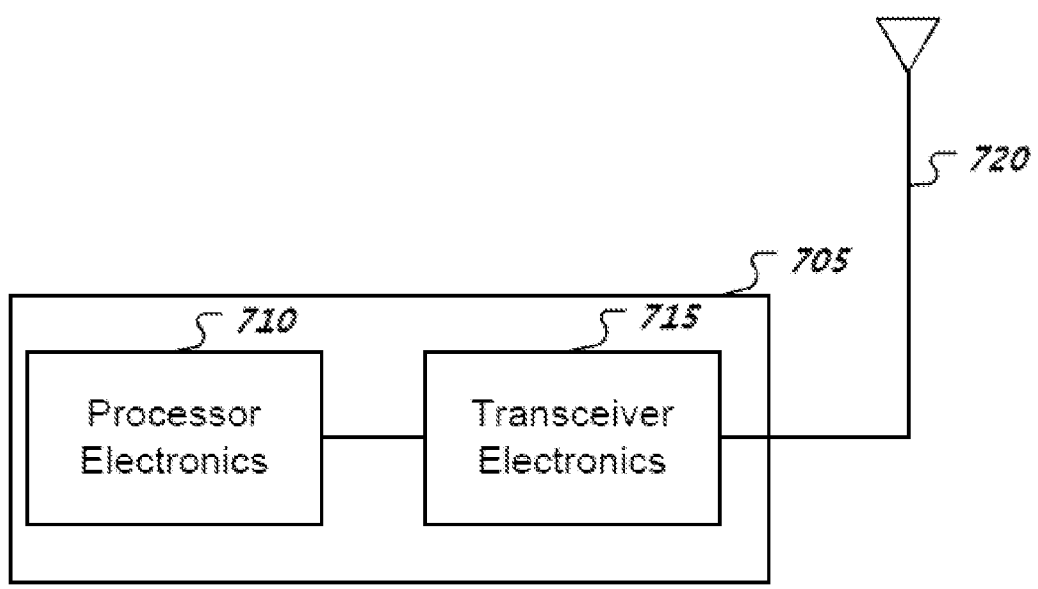
FIG. 7 is a block diagram representation of a portion of a hardware platform.

FIG. 7 is a block diagram representation of a portion of a hardware platform. A hardware platform 705 such as a network device or a base station or a wireless device (or UE) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 or a wireline interface. The hardware platform 705 can implement other communication interfaces with defined protocols for transmitting and receiving data. The hardware platform 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the hardware platform 705.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal, a message from a communication node; and
   configuring, by the terminal, responsive to the message, a state configuration of a serving cell according to the message,
   wherein the message includes an indication of a state of the serving cell and an identifier of a transmission configuration indicator (TCI) state used for physical downlink control channel (PDCCH) reception on a control-resource set (CORESET) configured for a downlink bandwidth part (BWP) of the serving cell, wherein the terminal utilizes the TCI state for the PDCCH reception, and wherein the state of the serving cell includes at least one of an activated state or a deactivated state.

2. The method of claim 1, wherein the message includes an indicator for a TCI state for physical downlink shared channel (PDSCH) reception.

3. The method of claim 2, wherein the indicator indicates whether the TCI state information is activated.

4. The method of claim 2, wherein the indicator indicates whether the TCI state information is used for PDSCH reception.

5. A non-transitory computer readable medium having code stored thereon, the code when executed by a processor, causes the processor to implement the method of claim 1.

6. An apparatus for wireless communication comprising:
   a processor; and
   a memory storing computer instructions, the computer instructions when executed by the processor cause the processor to:
     receive a message from a communication node; and
     configure, responsive to the message, a state configuration of a serving cell according to the message, wherein message includes an indication of a state of the serving cell and an identifier of a transmission configuration indicator (TCI) state used for physical downlink control channel (PDCCH) reception on a control-resource set (CORESET) configured for a downlink bandwidth part (BWP) of the serving cell, wherein the terminal utilizes the TCI state for the PDCCH reception, and wherein the state of the serving cell includes at least one of an activated state or a deactivated state.

7. The apparatus of claim 6, wherein the message includes an indicator for a TCI state for physical downlink shared channel (PDSCH) reception.

8. The apparatus of claim 7, wherein the indicator indicates whether the TCI state information is activated.

9. The apparatus of claim 7, wherein the indicator indicates whether the TCI state information is used for PDSCH reception.

10. A method for wireless communication, comprising:
    transmitting, by a communication node to a terminal, a message for configuring a state configuration of a serving cell, the message including an indication of a state of the serving cell and an identifier of a transmission configuration indicator (TCI) state used for physical downlink control channel (PDCCH) reception on a control-resource set (CORESET) configured for a downlink bandwidth part (BWP) of the serving cell, wherein the state of the serving cell includes at least one of an activated state or a deactivated state,
    the message triggering the terminal to configure the state configuration of the serving cell according to the message, wherein the TCI state is utilized for the PDCCH reception.

11. The method of claim 10, wherein the message includes an indicator for a second TCI state for physical downlink shared channel (PDSCH) reception.

12. The method of claim 11, wherein the indicator indicates at least one of:
    whether the second TCI state is activated; or
    whether the second TCI state is used for PDSCH reception.

13. A non-transitory computer readable medium having code stored thereon, the code when executed by a processor, causes the processor to causes the processor to implement the method of claim 10.

14. An apparatus for wireless communication comprising:
    a processor; and
    a memory storing computer instructions, the computer instructions when executed by the processor cause the processor to:
      transmit, to a terminal, a message for configuring a state configuration of a serving cell, the message including an indication of a state of a serving cell and an identifier of a transmission configuration indicator (TCI) state used for physical downlink control channel (PDCCH) reception on a control-resource set (CORESET) configured for a downlink bandwidth part (BWP) of the serving cell, wherein the state of the serving cell includes at least one of an activated state or a deactivated state,
      the message triggering the terminal to configure the state configuration of the serving cell according to the message, wherein the TCI state is utilized for the PDCCH reception.

15. The apparatus of claim 14, wherein the message includes an indicator for a second TCI state for physical downlink shared channel (PDSCH) reception.

16. The apparatus of claim 15, wherein the indicator indicates at least one of:
    whether the second TCI state is activated; or
    whether the second TCI state is used for PDSCH reception.

* * * * *